(12) United States Patent
Schulz et al.

(10) Patent No.: US 8,899,651 B2
(45) Date of Patent: Dec. 2, 2014

(54) ARM REST ARRANGEMENT FOR A MOTOR VEHICLE, AS WELL AS MOTOR VEHICLE WITH SUCH AN ARM REST ARRANGEMENT

(71) Applicant: GM Global Technology Operations LLC, Detroit, MI (US)

(72) Inventors: Harald Schulz, Hochheim (DE); Marcus Schoppe, Ruesselsheim (DE); Andreas Wille, Weiterstadt (JP)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/782,691

(22) Filed: Mar. 1, 2013

(65) Prior Publication Data

US 2013/0320693 A1    Dec. 5, 2013

(30) Foreign Application Priority Data

May 31, 2012    (DE) .......................... 10 2012 010 666

(51) Int. Cl.
*B60R 13/00* (2006.01)
*B60R 11/02* (2006.01)
*B60N 2/46* (2006.01)
*B60N 3/10* (2006.01)
*B60R 11/00* (2006.01)

(52) U.S. Cl.
CPC ......... *B60N 3/102* (2013.01); *B60R 2011/0075* (2013.01); *B60R 11/02* (2013.01); *B60N 2/4646* (2013.01); *B06N 2/4686* (2013.01); *B60R 2011/0061* (2013.01); *B60R 2011/0014* (2013.01)

USPC .......................................... 296/24.34; 296/97.8

(58) Field of Classification Search
USPC ............................................. 296/37.8, 24.34
See application file for complete search history.

(56) References Cited

U.S. PATENT DOCUMENTS

| | | | |
|---|---|---|---|
| 5,620,228 A | 4/1997 | Ito et al. | |
| 6,203,088 B1 | 3/2001 | Fernandez et al. | |
| 7,278,681 B2 * | 10/2007 | Lilov et al. | 297/188.17 |
| 2007/0063553 A1 | 3/2007 | Lilov et al. | |
| 2007/0262600 A1 * | 11/2007 | Chen | 296/37.8 |
| 2009/0066103 A1 * | 3/2009 | Koarai | 296/24.34 |
| 2009/0278370 A1 * | 11/2009 | DePue | 296/24.34 |
| 2010/0009049 A1 | 1/2010 | Smith | |
| 2011/0140472 A1 | 6/2011 | Vander-Sluis et al. | |

FOREIGN PATENT DOCUMENTS

| | | |
|---|---|---|
| DE | 19834546 A1 | 2/2000 |
| DE | 102005055454 A1 | 6/2006 |
| DE | 60315040 T2 | 3/2008 |
| EP | 0733510 A2 | 9/1996 |
| WO | 9500360 A1 | 1/1995 |

* cited by examiner

*Primary Examiner* — Joseph D Pape
(74) *Attorney, Agent, or Firm* — Ingrassia Fisher & Lorenz, P.C.

(57) ABSTRACT

An arm rest arrangement for a motor vehicle is provided. The arm rest arrangement includes an arm rest. The arm rest has a receptacle device displaceable between a retracted position and an extended position in a displacing direction. An arm rest carrier is arranged upon the arm rest. The arm rest is displaceable relative to the arm rest carrier between an initial position and a final position in an adjusting direction that is equidirectional to the displacing direction.

8 Claims, 5 Drawing Sheets

ARM REST ARRANGEMENT FOR A MOTOR VEHICLE, AS WELL AS MOTOR VEHICLE WITH SUCH AN ARM REST ARRANGEMENT

CROSS-REFERENCE TO RELATED APPLICATION

This application claims priority to German Patent Application No. 10 2012 010 666.1, filed May 31, 2012, which is incorporated herein by reference in its entirety.

TECHNICAL FIELD

The technical field pertains to an arm rest arrangement for a motor vehicle, as well as a motor vehicle with such an arm rest arrangement.

BACKGROUND

Arm rests serve for laying down and resting an arm and are used, for example, in automobiles. Arm rests in automobiles according to today's standards frequently comprise a storage compartment for storing an object.

EP 733510 B1 arguably represents the most closely related prior art and describes a cup holder arrangement that is integrated into an arm rest and realized in an extendable and retractable fashion. In addition, the arm rest can be pivoted about a pivoting axis such that the arm rest can be folded away, if so required.

At least one object herein is to provide an individually adjustable arm rest that allows a simple and user-friendly operation. In addition, other objects, desirable features and characteristics will become apparent from the subsequent summary and detailed description, and the appended claims, taken in conjunction with the accompanying drawings and this background.

SUMMARY

An arm rest arrangement for a motor vehicle in accordance with an exemplary embodiment is provided. The arm rest arrangement is positioned, for example, between two adjacent seats, particularly between a driver seat and a front passenger seat of the motor vehicle. The arm rest arrangement comprises an arm rest that features an arm supporting surface for laying down and resting an arm of one or two persons. The arm rest features a receptacle device that can be displaced between a retracted position and an extended position in a displacing direction. In this case, the displacing direction defines a linear direction, along which the receptacle device in the arm rest arrangement can be retracted and extended. The receptacle device therefore consists of a linearly movable component. In an embodiment, the receptacle device ends flush with the arm rest in the retracted position while the receptacle device at least sectionally protrudes from the arm rest in the extended position. The receptacle device is connected to the arm rest, for example, in a captive fashion in order to prevent the receptacle device from falling out or being unintentionally pulled out. For example, the receptacle device is secured by guide rails, for example telescopic rails, that make it possible to linearly retract and extend the receptacle device.

In an embodiment, the arm rest arrangement features an arm rest carrier on which the arm rest is arranged. The arm rest carrier, for example, is positively connected to the arm rest. In an embodiment, the arm rest carrier is mounted in a stationary fashion such that it is fixed in a certain position. The arm rest carrier is arranged, for example, on a center console of the motor vehicle.

The arm rest can be displaced relative to the arm rest carrier between an initial position and a final position in an adjusting direction that is equidirectional to the displacing direction. The adjusting direction defines a linear direction along which the arm rest can be displaced. The arm rest therefore consists of a linearly movable component. The term equidirectional refers to an at least approximately parallel orientation of the adjusting direction and the displacing direction that extend relative to one another at an angle of, for example, no more than 5°, such as no more than 3°. The adjusting direction and the displacing direction are realized, for example, parallel or congruent to one another. In an embodiment, the adjusting direction and/or the displacing direction extend(s) horizontally. In the initial position, the arm rest is fixed in a basic state, for example, in a retracted state. In the final position, the arm rest is arranged offset referred to the basic state along the adjusting direction such that the arm rest is fixed, for example, in an extended state.

Due to the ability to displace the arm rest, a user is able to individually adjust the arm rest in the respectively desired fashion. Another remarkable advantage is the arrangement of the receptacle device in the arm rest such that an additional stowage space is realized with a compact design. In addition, the receptacle device in the arm rest is within comfortable reach of the user and can be easily operated. Another advantage can be seen in that the receptacle device is during the displacement of the arm rest also displaced in the same fashion such that only one common adjustment is required.

In another embodiment, the arm rest is fixed in its position along the adjusting direction by a locking device. The locking device therefore makes it possible to realize interlocking positions of the arm rest along the adjusting direction. In this way, the arm rest is not merely fixed along the adjusting direction in the initial position and the final position, but the user can choose between several intermediate positions between the initial position and the final position. The locking device furthermore prevents an unintentional adjustment of the arm rest. In this way, it is ensured that the arm rest can only be adjusted by a user. The locking device is realized, e.g., in the form of a latch system or safety bolt system.

The arm rest is connected to the arm rest carrier, for example, by guide rails. The guide rails make it possible to displace the arm rest relative to the arm rest carrier along the adjusting direction and limit the displacement of the arm rest with the aid of two limit stops, wherein the limit stops form the initial position and the final position. The receptacle device may also be connected to the arm rest by additional guide rails. These guide rails make it possible to displace the receptacle device along the displacing direction and limit the displacement of the receptacle device with the aid of two limit stops, wherein the limit stops form the retracted and the extended position. For example, a damping system may be arranged on the guide rails such that the limit stops are reached quietly and in a dampened fashion. The guide rails for the arm rest carrier and/or for the receptacle device are realized, for example, in the form of telescopic rails.

The extension and retraction of the receptacle device along the displacing direction may be realized in a mechanical and/or electromotive fashion by the user. With respect to a mechanical extension and retraction, it would be possible to utilize a spring system such as, e.g., pressure springs that move the receptacle device into the extended and/or retracted position on demand with constant speed. With respect to an electromotive extension and retraction, it would be possible to utilize, e.g., a linear motor that is arranged in the arm rest and moves the receptacle device along the displacing direction. In this case, the electric extension and retraction can be controlled by an actuating button that is arranged, for example, directly on the arm rest. The actuating button makes it possible to extend and retract, e.g., a receptacle device in the form of a DVD drive. The mechanical spring system, as well as the linear motor, advantageously prevents an unintentional displacement of the receptacle device along the displacing direction. It is therefore ensured that the receptacle device can only be displaced by a user. One advantage of an electric extension and retraction can be seen in that the receptacle device can be opened or operated without having to provide a handle thereon. The receptacle device consequently can end flush with the surface of the arm rest in the retracted position. On the one hand, an aesthetic design characteristic of the arm rest is realized in this way. On the other hand, the receptacle device is barely visible or not visible at all to third parties in the retracted position such that the risk of unauthorized access by third parties can be minimized.

It would be possible to realize the receptacle device such that it can be locked in the retracted position in order to prevent access by everyone. In an embodiment, the receptacle device is locked manually by a lock arranged thereon.

With respect to the constructive design, in an embodiment, the arm rest arrangement comprises a functional module, wherein the functional module is interchangeably arranged in the receptacle device. The interchangeability enables the user to individually equip the receptacle device with at least one functional module and to carry out an exchange at any time. The functional module, for example, is arranged on a plane visible face of the receptacle device, wherein the visible face is directed, for example, toward the roof of the motor vehicle.

In another embodiment, the receptacle device features a mechanical interface and the functional module features a complementary mechanical interface, wherein the mechanical interface is mechanically coupled to the complementary mechanical interface. The mechanical interface and the complementary mechanical interface are respectively realized, for example, in the form of a socket and a plug that can be coupled to one another. In this way, the functional module is detachably connected to the receptacle device, particularly in a positive and/or non-positive fashion, and the functional module can be removed in a nondestructive fashion at any time. The exchange of the functional module for at least one other functional module can be realized user-friendly, cost-efficiently, quickly and at any time.

In a further embodiment, if two or more mechanical interfaces are arranged in the receptacle device, these interfaces are realized identically. In this context, identical means that the respective interfaces have an approximately identical or identical mechanical coupling contour. Due to this measure, the functional module can be arranged on the receptacle device in different positions. Consequently, a versatile variation of the arrangement of the functional module can be easily realized. The plurality of mechanical interfaces are arranged, e.g., at the same distance from one another and/or symmetrical to one another. The mechanical interfaces are arranged, for example, in lines and columns in a matrix-like fashion, wherein the distances between the lines and/or the distances between the columns are respectively identical. The uniformity of the mechanical interface and complementary interface makes it possible to connect a diverse assortment of functional modules. Due to the uniform mechanical coupling mechanism, a comprehensive installation of the functional modules into vehicles (cross carline application) can be realized.

The receptacle device is realized, e.g., in the form of a platform, the upper side of which forms the visible face, wherein the platform features at least one, two, three or a plurality of mechanical interfaces. The platform is realized, e.g., in the form of a flat or plane surface with the integrated mechanical and/or electrical interfaces. For example, the receptacle device features exactly one mechanical interface and the functional module features exactly one complementary mechanical interface that can be coupled to one another. As an exemplary alternative, the receptacle device may feature two mechanical interfaces and the functional module may feature two complementary mechanical interfaces that can be coupled to one another. It is sensible to provide a plurality of complementary interfaces on a functional module, e.g., if the functional module has such a weight that it could not be sufficiently retained in the receptacle device with only one complementary mechanical interface.

For example, the at least one functional module is realized in the form of a first drawer with a first mobile telephone, a second drawer with a second mobile telephone, the stowage compartment, a cup holder, a writing tablet, a telephone holder, a holder for mobile objects or a holder for electronic devices.

In a further embodiment, the receptacle device features an electrical interface and the functional module features a complementary electrical interface, wherein the electrical interface is electrically coupled to the complementary electrical interface. The functional module, for example, consists of an electrical device or of an adapter that produces a connection between the electrical interface and the electrical device. The electrical interface therefore serves, for example, for the power supply of the functional module. For example, the electrical interface may be realized in the form of a plug and the complementary electrical interface may be realized in the form of a socket or vice versa. It is advantageous to make available power at the electrical interface in the receptacle device such that the functional module can be supplied with power and at the same time is reliably stowed in the receptacle device.

The functional module is realized, for example, in the form of a remote control, a navigation system, a touchpad, a cigarette lighter, a display, a CD player, a DVD player or a charging station.

Depending on the size and the structural shape of the functional module arranged on the receptacle device, it may occur that the receptacle device cannot be displaced into the retracted position. For example, a functional module in the form of a touchpad may be excessively bulky with respect to the retraction of the receptacle device. Since the functional module, e.g. the touchpad, frequently serves for the control of operating elements in the vehicle, it may be sensible that the functional module is always within reach of the user.

In an exemplary embodiment, the receptacle device features a mechanical and an electrical interface. In this case, it would be possible that a mechanical interface is assigned to the electrical interface such that they are arranged, e.g., adjacent to one another. Alternatively, the electrical interface may be arranged in the mechanical interface. Both options make it possible to utilize a combination of two functional modules. In the first option, the functional modules are realized, e.g., in the form of a USB cable and a stowage compartment, wherein the USB cable extends into the storage compartment. In the second combination, the functional modules consist, e.g., of a first functional module in the form of a stowage compartment and a second functional module in the form of a mobile telephone. In this case, the stowage compartment may feature a recess, through which the electrical interface extends, such that mobile objects and/or a mobile telephone can be placed into the storage compartment and the mobile telephone can be simultaneously charge via the electrical interface. Consequently, a space-saving arrangement of two functional modules is realized in the receptacle space.

In another embodiment, the arm rest can be pivoted relative to the arm rest carrier about a horizontally aligned pivoting axis, wherein the horizontally aligned pivoting axis extends perpendicular to the adjusting direction. The pivoting axis is arranged, for example, in an end region of the arm rest on the face so as to achieve the greatest pivoting range possible. The pivoting range, for example, is from about 0° to about 270°, for example, from about 0° to about 180°, such as from about 0° to about 90°. The arm rest for example extends in a horizontal direction with an angle of about 0°. The pivoting mechanism enables the user to fold away the arm rest. The pivoting motion of the arm rest may be realized, e.g., by a hinge that represents a connecting element between the arm rest carrier and the arm rest, for example between the arm rest carrier and the guide rails of the arm rest. In this way, the arm rest is realized in such a way that it can be displaced along the adjusting direction, as well as pivoted, such that a versatile adjustment of the arm rest is achieved and the comfort for the user therefore is improved. In an embodiment, the locking device secures the arm rest in at least one pivoting position, wherein only the user is able to once again disengage the arm rest from this pivoting position. Unintentional pivoting of the arm rest therefore is prevented. In another embodiment, the arm rest can only be pivoted in the initial position. In a further embodiment, the receptacle device cannot be extended during a pivoting motion of the arm rest.

A motor vehicle with an arm rest arrangement of the above-described type also is provided. In an embodiment, the motor vehicle features a center console, on which the arm rest carrier is arranged. The center console extends, for example, from the dashboard of the motor vehicle up to the adjacent driver and front passenger seats.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

In the figures, corresponding or identical components are respectively identified by the same reference symbols.

Figure 1:
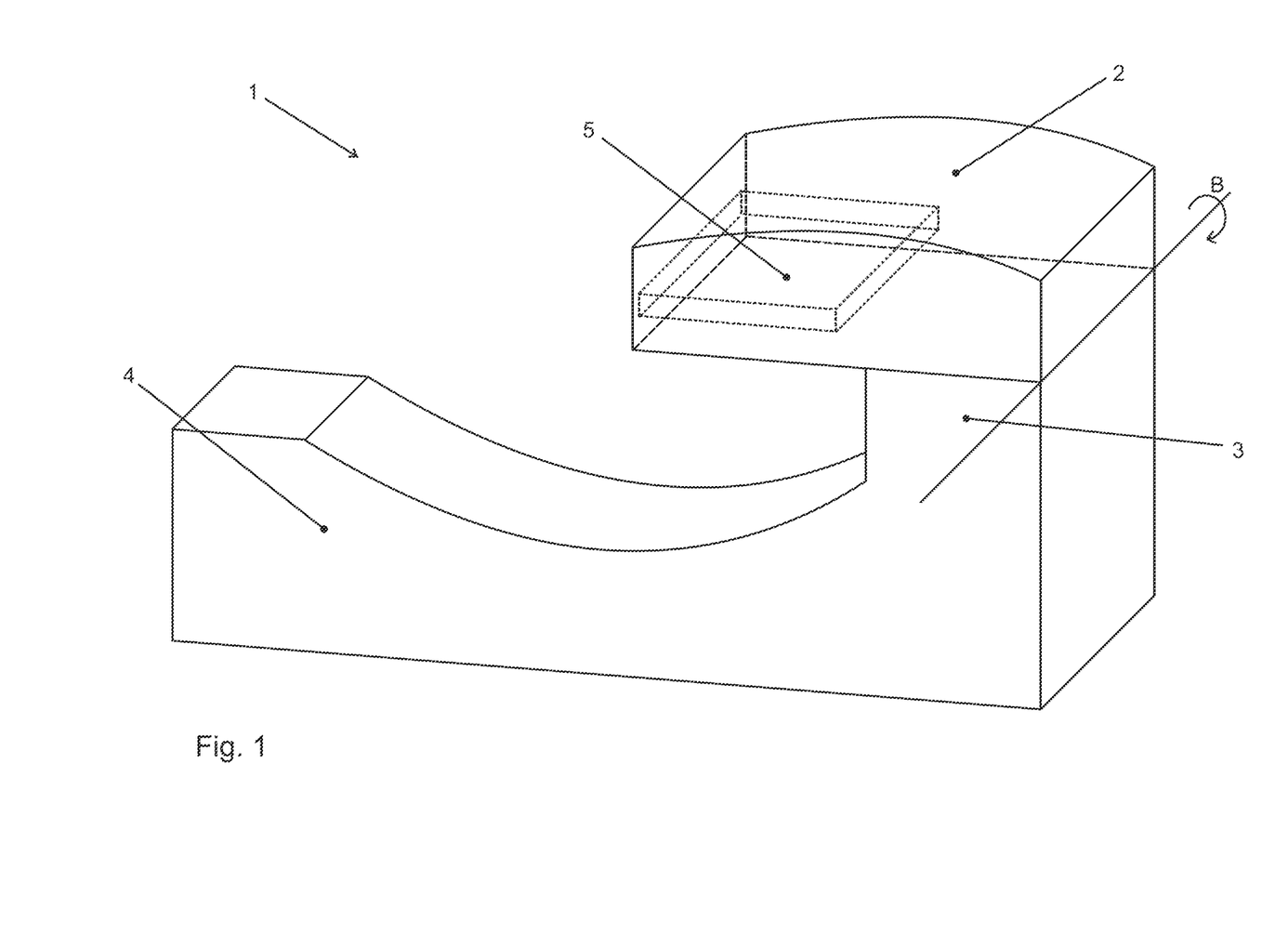
FIG. 1 shows a three-dimensional view of an arm rest arrangement with an arm rest in an initial position in accordance with an exemplary embodiment.

FIG. 1 shows a three-dimensional view of an exemplary embodiment of an arm rest arrangement 1. The arm rest arrangement 1 comprises an arm rest 2 that is arranged on an arm rest carrier 3. The arm rest carrier 3 is arranged stationarily and integrally connected to a center console 4 of a motor vehicle. For example, the center console 4 is arranged between a driver seat and a front passenger seat of the motor vehicle and extends in the longitudinal direction from the adjacent driver and front passenger seats to a dashboard of the motor vehicle.

Figure 2:
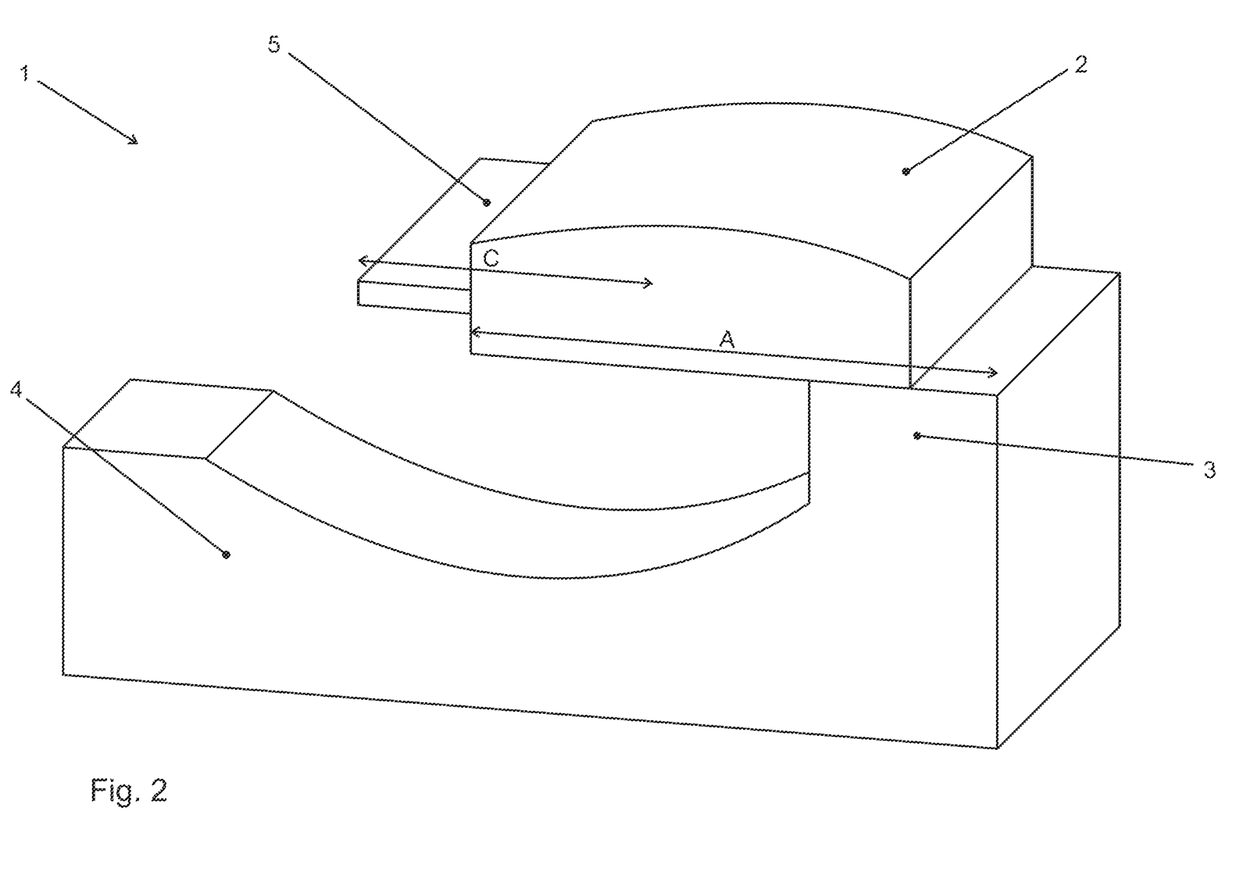
FIG. 2 shows a three-dimensional view of the arm rest arrangement of FIG. 1 with the arm rest in a final position.

According to FIG. 2, the arm rest 2 can be displaced relative to the arm rest carrier 3 from an initial position into a final position in an adjusting direction A. The arm rest 2 is in a retracted state in the initial position as illustrated in FIG. 1 and in an extended state in the final position as illustrated in FIG. 2. The adjusting direction A extends parallel to the longitudinal extent of the center console 4 such that the arm rest 2 moves toward the dashboard when it is displaced into the final position and away from the dashboard when it is displaced into the initial position. The displacement of the arm rest 2 along the adjusting direction A may be realized, e.g., with telescopic rails arranged between the arm rest 2 and the arm rest carrier 3.

In an embodiment, the arm rest 2 can be pivoted relative to the arm rest carrier 3 about a pivoting axis B that extends perpendicular to the adjusting direction A. The pivoting motion may be realized, e.g., with the aid of hinges. In this case, it would be possible that the hinges have several locking positions about the pivoting axis B in order to allow an angular adjustment of the arm rest 2. The arm rest can be pivoted, e.g., from a horizontal position into a vertical position.

In another embodiment, the arm rest 2 comprises a receptacle device 5 that is realized in the form of a platform. The receptacle device 5 can be displaced between a retracted position and an extended position along a displacing direction C. The receptacle device 5 is in a closed state in the retracted position as illustrated in FIG. 1 and in an open state in the extended position as illustrated in FIG. 2. The adjusting direction A and the displacing direction C are arranged parallel to one another. Consequently, the arm rest 2 and the receptacle device 5 move in the same direction and parallel to the longitudinal extent of the center console 4. The displacement of the receptacle device 5 along the displacing direction C may be realized, e.g., with the aid of telescopic rails.

The receptacle device 5 serves for accommodating one or more functional modules 6. The functional module 6 is detachably arranged in the receptacle device 5 such that the functional module 6 can be exchanged for another functional module 6. The receptacle device 5 features a visible face in the form of a surface, on which the functional module 6 is arranged. The visible face is directed toward the roof of the motor vehicle.

Figure 3:
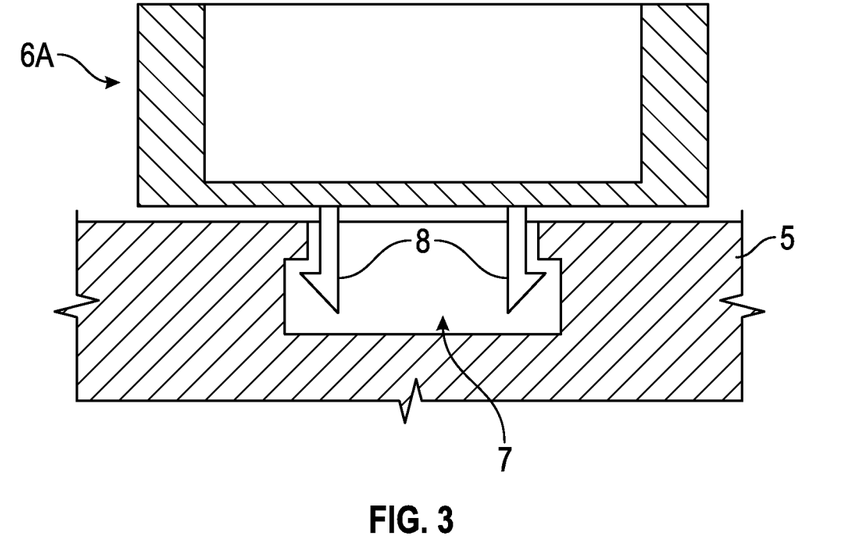
FIG. 3 shows a cross sectional view through a functional module that is arranged on a receptacle device of an arm rest arrangement according to FIG. 1.

In an exemplary embodiment, FIG. 3 shows the receptacle device 5 with a functional module 6A that is detachably coupled to the receptacle device 5. The receptacle device 5 features a mechanical interface 7 and the functional module 6A features a complementary mechanical interface 8. The mechanical interface 7 is realized in the form of a snap-in receptacle and the complementary mechanical interface 8 is realized in the form of two snap-in tabs that are engaged in the snap-in receptacle. Consequently, a non-positive connection is produced between the receptacle device 5 and the functional module 6A. In this way, the functional module 6A can be removed with a certain expenditure of force such that the functional module 6A is arranged on the receptacle device 5 in a captive fashion. The functional module 6A is realized in the form of a stowage compartment, in which different mobile objects such as, e.g., a wallet or a remote control can be stowed.

Figure 4:
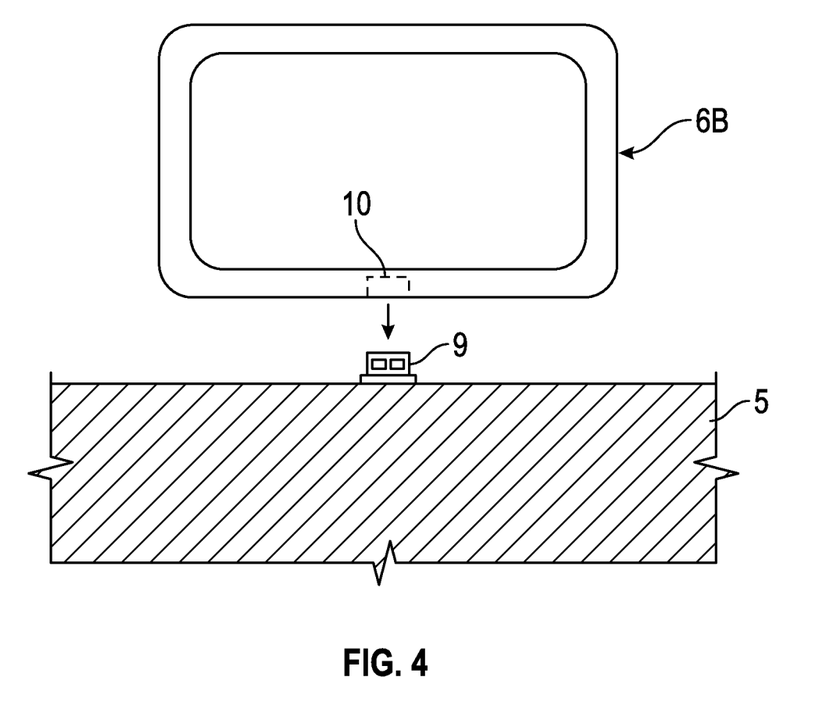
FIG. 4 shows a cross sectional view through the receptacle device of the arm rest arrangement according to FIG. 1 with an electrical interface.

In another exemplary embodiment, FIG. 4 shows the receptacle device 5 with a functional module 6B that is realized in the form of a navigation device. However, the functional module 6B may also be realized in the form of a cigarette lighter, an adapter for an electrical device or a miscellaneous electrical device. In order to supply the navigation system or miscellaneous electrical functional module 6B with power, the receptacle device 5 features an electrical interface 9 that is compatible with a complementary electrical interface 8 of the navigation system or miscellaneous electrical functional module 6B. The electrical interface 9 protrudes from the visible face of the receptacle device, but the electrical interface may also be realized such that it ends flush with the visible face or is recessed into the platform. In this example, the electrical interface 9 is realized in the form of a USB port and the complementary electrical interface 10 is realized in the form of a USB connector.

Figure 5:
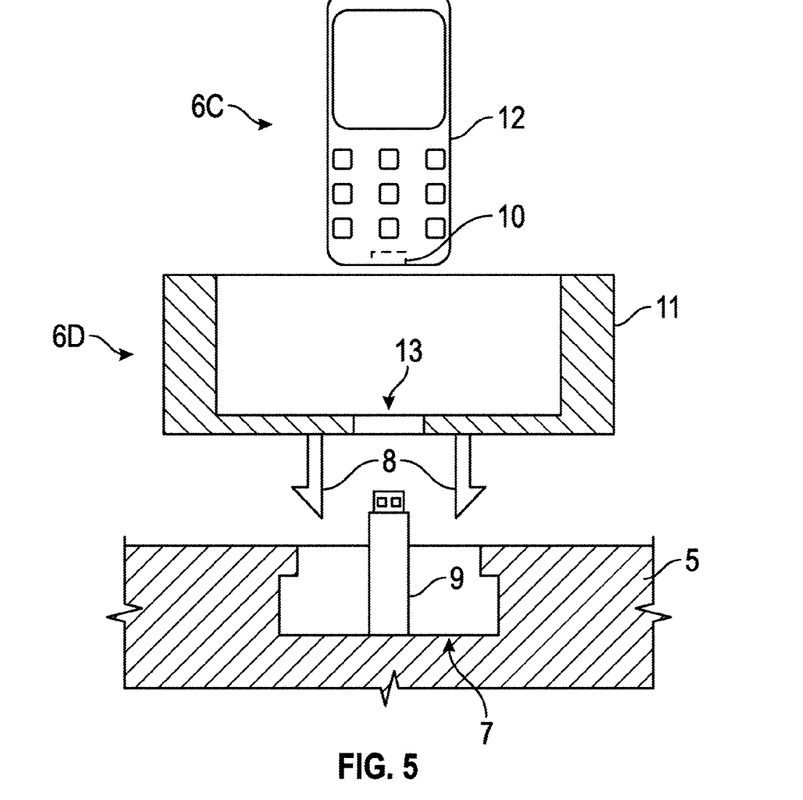
FIG. 5 shows a cross sectional view through the receptacle device of the arm rest arrangement according to FIG. 1 with an electrical and mechanical interface.

In a further embodiment, FIG. 5 shows the receptacle device 5 with two functional modules 6C, 6D, wherein one functional module 6D is realized in the form of a stowage compartment 11 and the other functional module 6C is realized in the form of a mobile telephone 12. The mobile telephone 12 may lie in the stowage compartment 11 on a flat side such that the touchpad of the mobile telephone 12 can be easily operated. The receptacle device 5 features the electrical interface 9 and the mechanical interface 7, wherein the electrical interface 9 is arranged in the mechanical interface 7. Consequently, the mechanical and the electrical interface 7, 9 are combined with one another. The stowage compartment 11 features a recess 13 such that the complementary electrical interface 10 of the mobile telephone 12 can be connected to the electrical interface 9 of the receptacle device 5. Due to the combination of the mechanical and the electrical interface 7, 9, it is possible to realize two functions in a space-saving fashion, namely the creation of a stowage space and the power supply of an electrical device in this exemplary embodiment.

Figure 6:
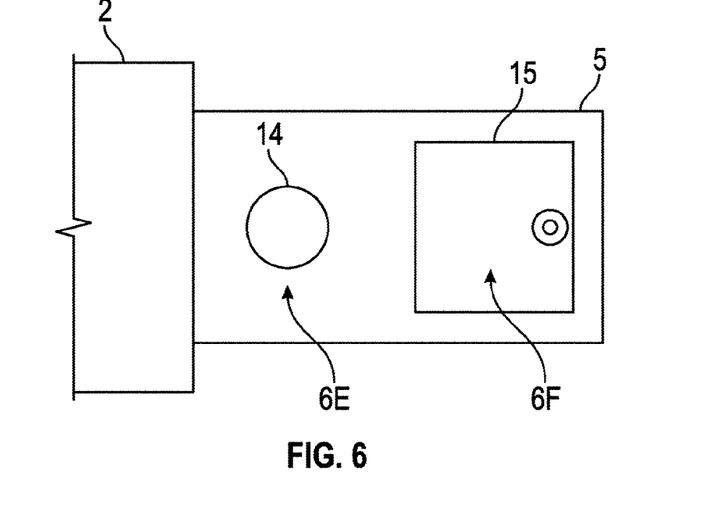
FIG. 6 shows a top view of an arm rest according to FIG. 1 with a receptacle device comprising a plurality of functional modules.
Figure 7:
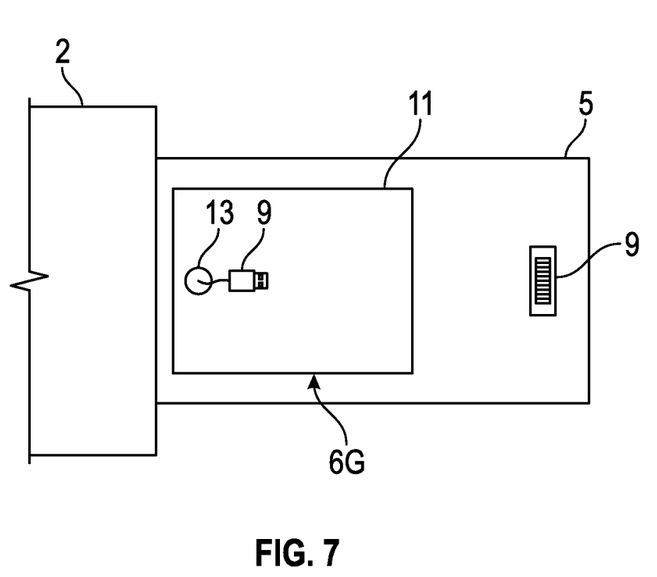
FIG. 7 shows a top view of the arm rest according to FIG. 1 with a receptacle device comprising a plurality of alternative functional modules.

FIGS. 6 and 7 show two graphic examples of the receptacle device 5 with differently arranged functional modules 6E, 6F, 6G.

In an embodiment, FIG. 6 shows a top view of the receptacle device 5 in the extended position with two functional modules 6E, 6F that are arranged in a row, wherein the first functional module 6E is realized in the form of a cup holder 14 and the second functional module 6F is realized in the form of a touchpad 15. Since the touchpad 15 needs to be supplied with power, the receptacle device 5 features at least one electrical interface 9. Due to the size and the weight of the touchpad 15, however, it is advantageous to provide a combination of a mechanical and an electrical interface 7 in order to ensure a secure retention of the touchpad 15 on the receptacle device 5.

FIG. 7, in another embodiment, a top view of the receptacle device 5 in the extended position with two electrical interfaces 9 and one functional module 6G that is realized in the form of a stowage compartment 11. The first electrical interface 9 consists of a USB port that extends through the recess 13 of the storage compartment 11. The second electrical interface 9 consists of a docking station that serves for connecting, e.g., an MP3 player or a mobile telephone.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An arm rest arrangement for a motor vehicle, the arm rest arrangement comprising:
    an arm rest, comprising: a receptacle device displaceable between a retracted position and an extended position in a displacing direction, wherein the receptacle device extends out of the arm rest when in the extended position, wherein the receptacle device comprises a mechanical interface; and
    an arm rest carrier upon which the arm rest is arranged, wherein the arm rest is displaceable relative to the arm rest carrier between an initial position and a final position in an adjusting direction that is equidirectional to the displacing direction, wherein the arm rest is capable of pivoting relative to the arm rest carrier about a horizontally aligned pivoting axis, and wherein the horizontally aligned pivoting axis extends perpendicular to the adjusting direction; and
    a functional module interchangeably arranged in the receptacle device, wherein the functional module comprises: a complementary mechanical interface that mechanically and detachably couples to the mechanical interface to allow the functional module to be removed from the receptacle device.

2. The arm rest arrangement according to claim 1, wherein the functional module comprises:
    a stowage compartment, a cup holder, a telephone holder, a holder for mobile objects or
    a holder for electronic devices.

3. The arm rest arrangement according to claim 1,
    wherein the receptacle device comprises: an electrical interface, and
    further comprising:
    another functional module that comprises: a complementary electrical interface, wherein the electrical interface is configured to be electrically coupled to the complementary electrical interface.

4. The arm rest arrangement according to claim 3, wherein the functional module comprises: a navigation system, a touchpad, a display, or a charging station.

5. The arm rest arrangement according to claim 3, wherein a mechanical interface is assigned to the electrical interface or the electrical interface is arranged in the mechanical interface.

6. A motor vehicle with an arm rest arrangement, the arm rest arrangement comprising:
    an arm rest, comprising: a receptacle device displaceable between a retracted position and an extended position in a displacing direction, wherein the receptacle device comprises an electrical interface that is configured to be electrically coupled to a complementary electrical interface of a functional module that is disposable in the receptacle device; and an arm rest carrier upon which the arm rest is arranged, wherein the arm rest is displaceable relative to the arm rest carrier between an initial position and a final position in an adjusting direction that is equidirectional to the displacing direction.

7. The motor vehicle according to claim 6, wherein the motor vehicle comprises a center console upon which the arm rest carrier is arranged.

8. An arm rest arrangement for a motor vehicle, the arm rest arrangement comprising:
- an arm rest, comprising:
  - a receptacle device displaceable between a retracted position and an extended position in a displacing direction, wherein the receptacle device extends out of the arm rest when in the extended position, wherein the receptacle device comprises:
    - a mechanical interface that is configured to mechanically couple to a complementary mechanical interface of a functional module to allow the functional module to be removed from the receptacle device, and
    - an electrical interface that is configured to electrically couple to a complementary electrical interface of another functional module; and
- an arm rest carrier upon which the arm rest is arranged, wherein the arm rest is displaceable relative to the arm rest carrier between an initial position and a final position in an adjusting direction that is equidirectional to the displacing direction.

* * * * *